(12) United States Patent
Lewis, Sr. et al.

(10) Patent No.: US 9,964,250 B2
(45) Date of Patent: May 8, 2018

(54) METHOD OF INSPECTING AND PREPARING A PIPELINE

(75) Inventors: Kim Lewis, Sr., Kingsville (CA); Jeff Lewis, Kingsville (CA); Darcy Warren, Essex (CA)

(73) Assignee: Liqui-Force Services (Ontario) Inc., Kingsville, Ontario (CA)

( * ) Notice: Subject to any disclaimer, the term of this patent is extended or adjusted under 35 U.S.C. 154(b) by 840 days.

(21) Appl. No.: 13/576,228

(22) PCT Filed: Jul. 28, 2011

(86) PCT No.: PCT/CA2011/000856
§ 371 (c)(1),
(2), (4) Date: Jul. 31, 2012

(87) PCT Pub. No.: WO2012/016321
PCT Pub. Date: Feb. 9, 2012

(65) Prior Publication Data
US 2012/0305031 A1      Dec. 6, 2012

Related U.S. Application Data

(60) Provisional application No. 61/370,835, filed on Aug. 5, 2010.

(51) Int. Cl.
*F16L 55/18*      (2006.01)
*B08B 9/04*       (2006.01)
*E03F 7/12*       (2006.01)

(52) U.S. Cl.
CPC ............... *F16L 55/18* (2013.01); *B08B 9/04* (2013.01); *E03F 7/12* (2013.01)

(58) Field of Classification Search
None
See application file for complete search history.

(56) References Cited

U.S. PATENT DOCUMENTS

| 4,677,472 A | | 6/1987 | Wood | |
|---|---|---|---|---|
| 4,896,686 A | * | 1/1990 | Schmidt et al. | .......... 134/167 C |

(Continued)

FOREIGN PATENT DOCUMENTS

| CA | 2477063 | 2/2005 |
|---|---|---|
| CA | 2309018 | 11/2011 |

OTHER PUBLICATIONS http://lancet.m it. edu/motors/motors3.html.*
International Search Report & Written Opinion for PCT Application No. PCT/CA2011/000856 dated Oct. 6, 2011.

*Primary Examiner* — Mikhail Kornakov
*Assistant Examiner* — Pradhuman Parihar
(74) *Attorney, Agent, or Firm* — Carlson, Gaskey & Olds, P.C.

(57) ABSTRACT

A sewer preparation from the main (PFM) device provides for the inspection and preparation of the sewer pipe from the main sewer pipe. The PFM device provides for the insertion of one or more individual and separately controllable tools into the sewer pipe. The tools include a clean out tool and a camera. Each of the tools is controlled separately such that each tool can be inserted and retracted from the lateral as desired. A method includes the steps of inserting and operating separately controllable tools from a single preparation device that provides access to the lateral without a cleanout or other alternate access passage.

10 Claims, 5 Drawing Sheets

(56) References Cited

U.S. PATENT DOCUMENTS

| | | | |
|---|---|---|---|
| 5,018,545 A | | 5/1991 | Wells |
| 5,495,157 A | * | 2/1996 | Dade ................. B65H 75/4484 242/225 |
| 5,571,977 A | * | 11/1996 | Kipp ............................ 73/865.8 |
| 6,887,014 B2 | * | 5/2005 | Holland ................. B08B 9/049 104/138.2 |

* cited by examiner

METHOD OF INSPECTING AND PREPARING A PIPELINE

CROSS REFERENCE TO RELATED APPLICATION

This application claims priority to U.S. Provisional Application No. 61/370,835 which was filed on Aug. 5, 2010.

BACKGROUND

This disclosure generally relates to a method of preparing and measuring a sewer pipe prior to installation of a cured in place pipe lining. A cured in place pipe lining method utilizes a resin soaked liner that is installed within a sewer. The resin soaked liner is forced against the inner walls of a sewer with fluid or mechanical pressure until cured. Once cured the liner becomes a new pipe within the original pipe. The resin soaked liner is custom tailored to the particular sewer pipe to match diameter and length requirements. Accordingly, prior to installation, the old sewer pipe is cleaned and measured. Cleaning can require cutting away debris such as roots and other accumulations that impede desired fluid flow. Measurements such as the pipe diameter are required for the entire desired length of lining. Further, in many instances a video inspection of the sewer is desired to contrast the original and repaired state of the sewer pipe.

Cleaning, measuring and videoing the interior of a sewer pipe are complicated due to the confined environment and limited accessibility. Moreover, a service lateral pipe leading from a building or home into a larger main sewer pipe further complicates access by the required tools and video equipment. It is undesirable to access through the home, and difficult to gain access through the main. In some instances, a secondary pipe referred to as a clean out is installed to provide access to the lateral sewer pipe. This is also undesirable as installation of a clean out often requires digging in a home owner's front yard while also incurring additional costs and time.

SUMMARY

A disclosed sewer preparation from the main (PFM) device provides for the inspection and preparation of the sewer pipe from the main sewer pipe. The PFM device provides for the insertion of one or more individual and separately controllable tools into the sewer pipe. The tools include a clean out tool and a camera. Each of the tools is controlled separately such that each tool can be inserted and retracted from the lateral as desired.

The PFM device is controlled through support lines that originate from a support vehicle. The PFM device is moved into place by a tow machine that includes camera that is controlled from the support vehicle. The support vehicle includes equipment to control movement of the tools and for viewing images provided by the camera. The control conduits and support lines include hydraulic conduits, water hoses, electrical communication conduits along with any other required control, or supply lines that are required to operate the tools.

A separate measurement from the main (MFM) device is also disclosed for extending and driving a measurement tool into the pipe. The measurement tool provides measurement date representative on an inner profile of the pipe for specific positions within that pipe.

A disclosed example method provides for inspection, preparation and measurement of a lateral sewer from the main utilizing PFM and/or MFM device. Moreover, the disclosed example method includes the method steps of inserting and operating separately controllable tools from a single preparation device that provides access to the lateral without a cleanout or other alternate access passage.

These and other features disclosed herein can be best understood from the following specification and drawings, the following of which is a brief description.

DETAILED DESCRIPTION

Figure 1:
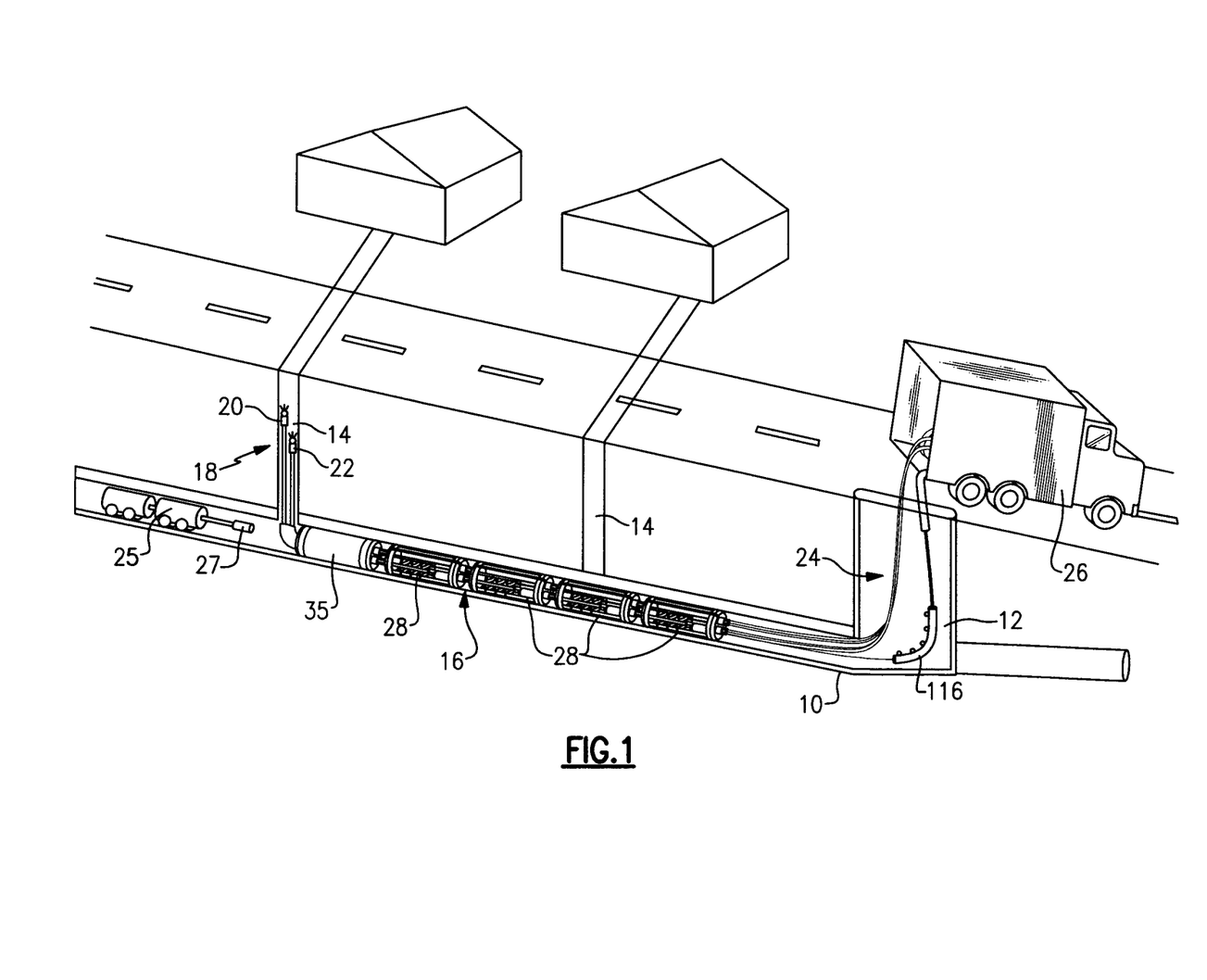
FIG. 1 is a schematic view of an example sewer system and preparation from the main device.

Referring to FIG. 1, an example sewer system is schematically shown and includes several service lateral sewer pipes 14 that lead into one common main sewer pipe 10. Access to the main 10 is provided through a manhole 12. Each of the laterals 14 lead to a residence or building. A current method of repairing aged sewer lines requires digging down to the sewer pipe and replacing it. A less intrusive method referred to as a cured in place pipe (CIPP) method utilizes a resin impregnated liner that is inserted and held in place until cured to form a new pipe within the old pipe. The use of the CIPP method does not require excavation and is therefore preferred for many repairs. However, the sewer pipes must be clear of debris and other intrusions such as plant roots that clog and constrict fluid flow.

Figure 2:
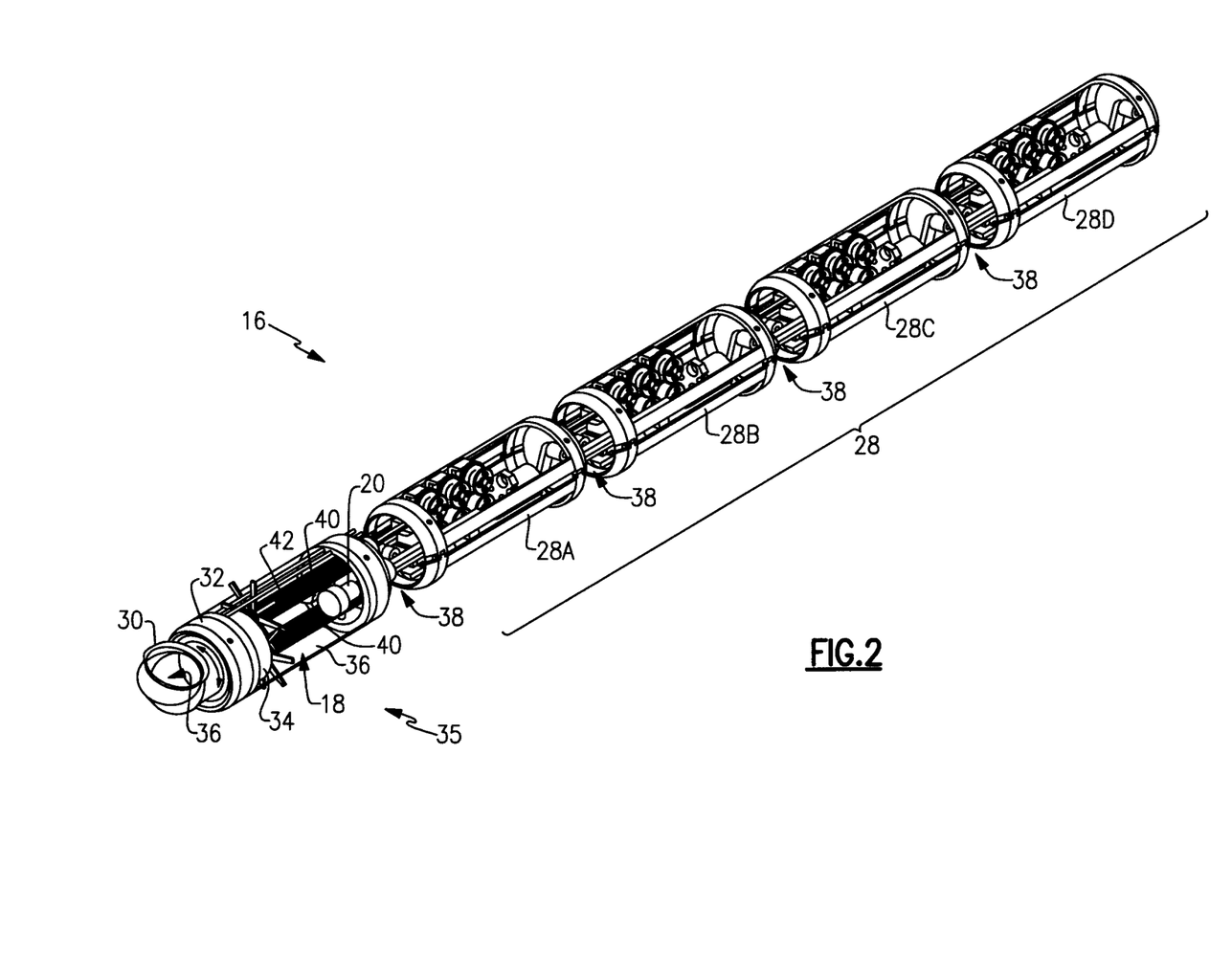
FIG. 2 is a perspective view of an example preparation from the main device.

Referring to FIG. 2 with continued reference to FIG. 1, a disclosed example preparation from the main (PFM) device 16 provides for the inspection and preparation of the lateral sewer pipe 14 from the main sewer pipe 10. The example PFM device 16 provides for the insertion of one or more individual and separately controllable tools 18 into the lateral sewer pipe 14. The example tools 18 include a clean out tool 20 and a camera 22. Each of the tools 20, 22 are controlled separately such that each tool can be inserted and retracted into the lateral 14 as desired.

The PFM device 16 is controlled through support lines generally indicated at 24 that originate from a support vehicle 26. Further, the PFM device 16 is moved into place by a tow machine indicated at 25 that includes camera 27. The support vehicle 26 includes equipment to control movement of the tools 18 and for viewing images provided by the camera 22. The support lines 24 include hydraulic conduits, water hoses, electrical communication conduits along with any other required control and supply lines required to operate the tools 18.

As appreciated, although the disclosed example PFM device 16 relies on a tow machine 25, it is within the contemplation of this disclosure to include a drive system as part of the PFM device 16 such that is self-propelled. In such an example device, the PFM device 16 would include a drive system for moving through the main pipe 10. The drive system (not shown) would be controlled by an operating within the support vehicle 26. Moreover, the PFM device 16 could also be dragged into place by a winch system that pulls the PFM through the main 10 to a desired position. In both the self-powered and the winch positioned systems, the positioning camera 27 would be supported on the PFM device 16 to provide images utilized to indicate a position and align the PFM device 16 with a lateral 14.

Referring to FIG. 2, the example PFM device 16 includes multiple driver modules 28 for moving a corresponding one of the tools 18 within the sewer pipe 14. In this example, four driver modules 28 are shown and four separate tools 18 are operable from the PFM 10.

In this description, when referring to all of the driver modules the reference numeral 28 will be utilized and when referring to specific one of the driver modules 28, the appropriate reference numeral 28A, 28B, 28C, and 28D will be utilized. Moreover, corresponding features in each of the driver modules 28 will also be referred to generally by the reference number without a letter, and to a specific feature corresponding with the letter corresponding to that driver module 28.

The launch head 35 is coupled to the front of the driver modules 28 and includes a snout 30. The snout 30 is mounted to a rotatable collar 32 and defines a passage for the tools 18. A hydraulic motor 34 drives rotation of the collar 32 to position an opening 36 in the snout 30 with the opening of the lateral sewer pipe 14. The launch head 35 includes an interior space 36 where the tools 18 are stored when not in use.

Figure 3:
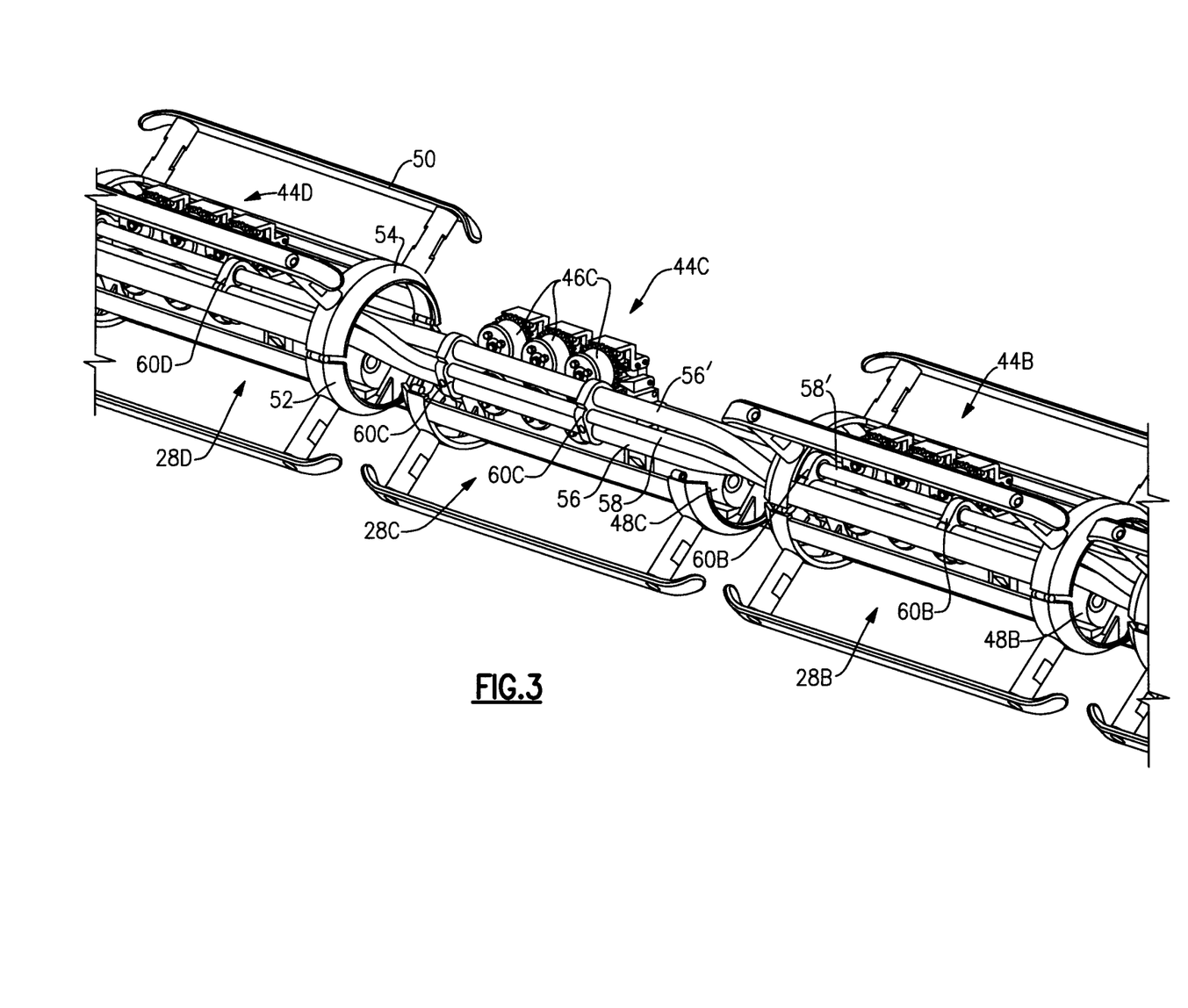
FIG. 3 is a perspective view of a portion of the example preparation from the main device.

Referring to FIG. 3 with continued reference to FIG. 2, the tools 18 are attached to an end of a corresponding cable or hose that runs through each of the proceeding driver modules 28 and back to the support vehicle 26. In this example, the tools 18 include a first water powered tool 20, a first camera 22, a second water powered tool 40 and a second camera 42. Each of the water powered tools 20 and 40 are attached to the end of a corresponding water hose 56. Each of the cameras 22, 42 are attached to the end of a cable 58 including the required electrical connections to illuminate the interior of the sewer pipe 14 and to transmit images back to a display within the support vehicle 26. The specific configuration of the water tools 20, 40 is determined by the application specific requirements.

A drive assembly 44 is mounted within each of the driver modules 28 for driving each of the hoses 56 and cables 58 thereby driving the tools 18 out through the snout 30 and into the sewer pipe 14. The drive assembly 44 includes drive wheels 46 that are driven by a motor 48. The example motor 48 is hydraulically driven. Accordingly, the control cables 24 leading into the support vehicle 26 include hydraulic lines that supply a pressurized flow of hydraulic fluid to each of the motors 48. Each of the hoses 56 and cables 58 are threaded through a corresponding set of the drive wheels 46 within one of the driver modules 28. In other words, each of the water hoses 26 runs through one set of drive wheels 46. For example, one water hose 56 runs through the driver wheels in the first module 28A and a second water hose run through the driver wheels 46 in the second driver module 28B. The first cable 58 runs through driver wheels in the third driver module 28C and the second cable 58 runs through driver wheels in the fourth driver module 28D.

Figure 4:
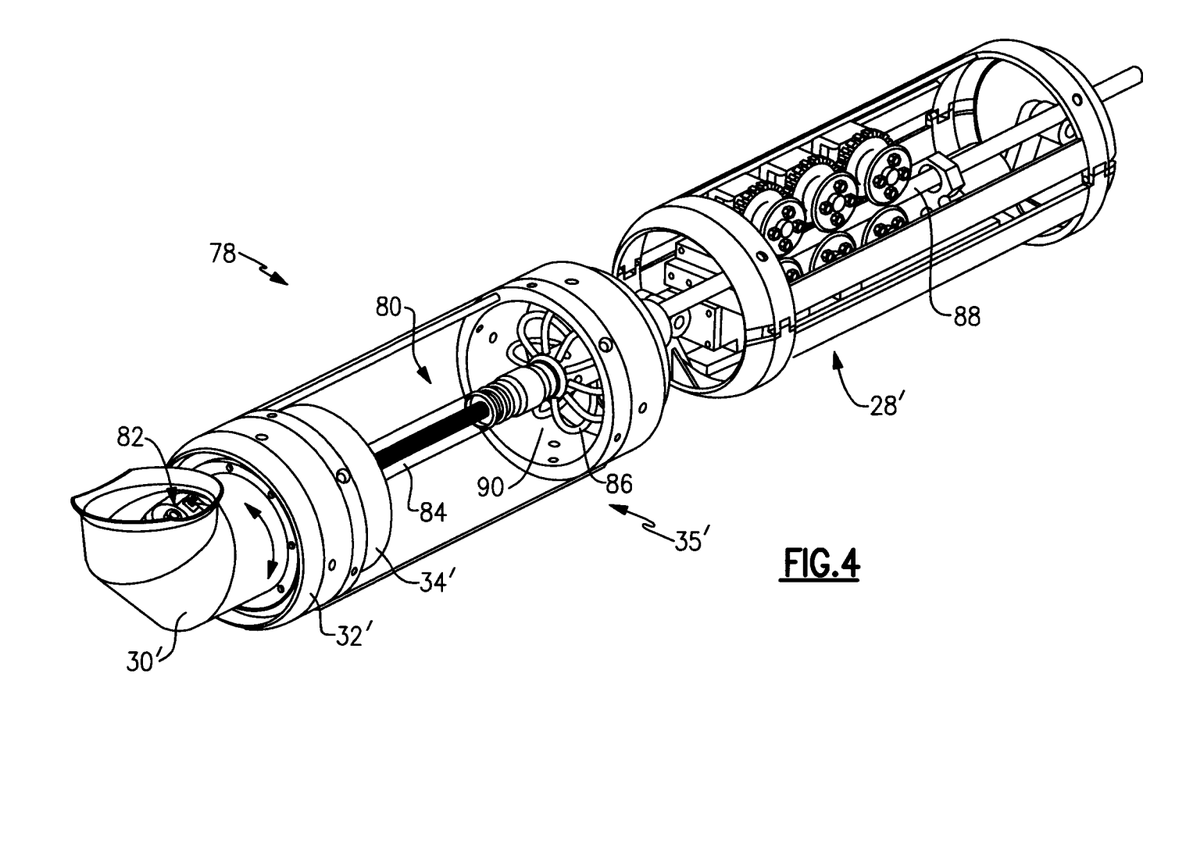
FIG. 4 is a perspective view of a measurement from the main device.
Figure 5:
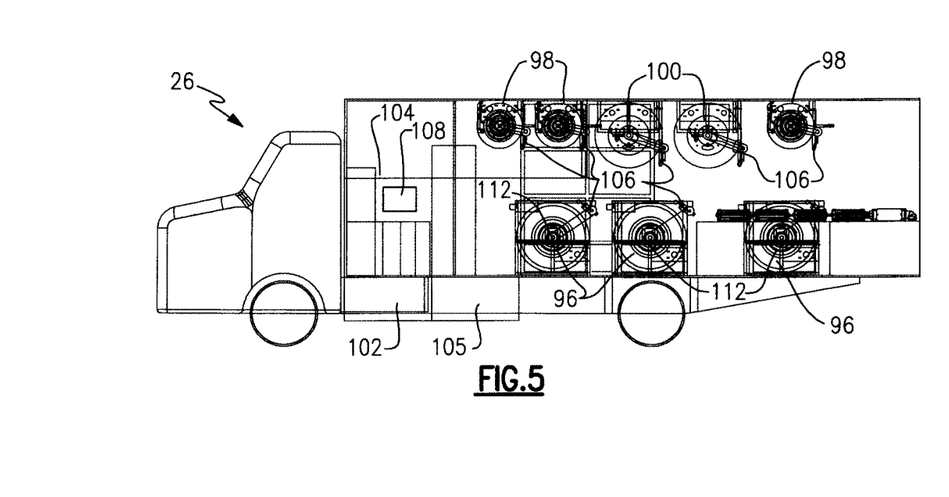
FIG. 5 is a side view of an example support vehicle.
Figure 6:
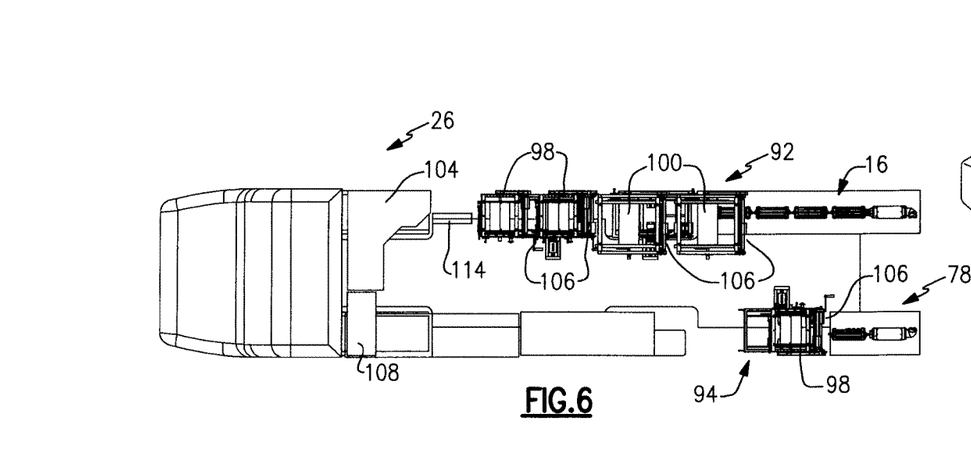
FIG. 6 is a top view of the example support vehicle.
Figure 7:
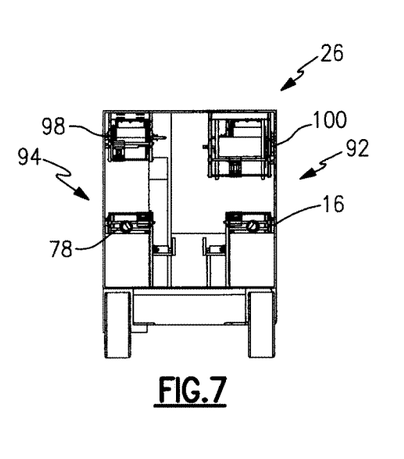
FIG. 7 is a rear view of the example support vehicle.
Figure 8:
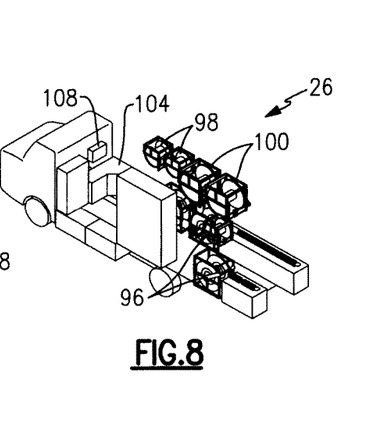
FIG. 8 is a perspective view of the example support vehicle.

Referring to FIG. 4, a measurement from the main (MFM) device 78 includes a measurement tool 80 supported within a launch head 35'. The launch head 35' includes the same snout 30, collar 32 and motor 34 as the PFM device 16. The MFM device 78 includes one driver module 28' to provide and control movement of the measurement head 80 into the sewer pipe.

The example measurement tool 80 includes fingers 86 that expand radially outward from a head 90 to contact the interior walls of the sewer pipe. The fingers 86 are supported rearward of a front camera 82. The fingers 86 are spaced apart from the camera 82 by a resilient flexible member 84. In this example, the flexible member 84 comprises a spring member that provides flexibility and relative movement between the camera 82 and the fingers 86. The relative flexibility provided between the camera 82 and the fingers 86 provide for movement through bends curves and other configuration of a sewer pipe.

A cable 88 is attached to the measurement tool 80 and is driven by the driver module 28'. The cable 88 extends rearward from the MFM device 78 back to the support vehicle 26.

Referring to FIGS. 5, 6, 7 and 8 the support vehicle 26 supports hydraulic hoses, water hoses and electrical communication cables for both the PFM device 16 and the MFM device 78. The support vehicle 26 includes a prep side 92 that includes those hoses, and cables attached to the PFM device 16 and a measurement side 94 that includes hoses and cable for the MFM device 78. A generator/pump 102 is mounted to the support vehicle 26 to power the electrical devices and to provide the required hydraulic pressure desired to operate the drive assemblies 44. Moreover, the support vehicle 26 includes tanks 105 for storing water, and the necessary hydraulic fluid. Water may also be routed through the support vehicle from an external source.

Hydraulic control hoses for supplying hydraulic fluid to the driver motors 48 are supported on reels 96. Each of the example reels 96 supports five hydraulic hoses. Accordingly, two reels 96 are provided on the prep side 92 to provide ten total hydraulic control hoses. Each of the PFM devices 16 four drive motors 48 are connected to two hydraulic lines for a total of eight, and the motor 34 for rotating the snout 30 are connected to two hydraulic lines. The MFM device 78 utilizes four hydraulic lines total such that only one reel 96 is required on the measurement side 94.

The prep side 92 includes water hose reels 100 for supplying water to the water powered tools 20, 40. The prep side 92 also includes cable reels 98 that support communication cables that are attached to cameras 22 and 42. The measurement side 94 includes one cable reel 98 that supports the cable utilized to transmit information and images gathered by the measurement tool 80.

Each of the reels 96, 98 and 100 are rotated by a reel motor 112 to control feeding out of the corresponding hose or cable. In this example the reel motors 112 are hydraulic motors; however electric motors could also be utilized. Rotation of each reel is coordinated with movement of the PFM device 16 and the MFM device 78. A sensor 106 is disposed on each of the different reels 96, 98 and 100 to provide information on the speed with which the corresponding hose or cable is being fed out, along with the length of hose or cable fed out. The example sensor 106 provides a linear measurement of the length of hose or cable fed from the support vehicle 26 and is utilized to measure and determine a location of a tool 18 or the measurement tool 80 within the sewer.

A control suite 104 controls operation of each of the reels 96, 98, 100, along with the drive motors 48 within the PFM device 16 and the MFM device 78. The control suite 104 includes at least one display 108 for displaying system operation information along with images transmitted from the cameras 20, 42, 82 and 27. The control suite 104 includes a controller 110 that provides comprehensive control over the drive motors 48 within the drive modules 28 and the hydraulic motors 112 that drive the reels 96, 98 and 100. The control suite 104 also includes manual controls for operating each drive motors 48 and reel motors 112.

The controller 110 synchronizes operation and actuation of each drive motor 48 with the corresponding reel motor 112. Moving one of the tools 18 out through the snout 30 into the lateral requires driving the corresponding hose or cable with the corresponding drive motor 48. Corresponding rotation of the corresponding reel is also required to feed hose or cable as required. Operation of the drive motor 48 pulls on the hose or cable while rotation of the reel motor 112 pushes the same hose or cable. Movement of the drive motor 48 and the reel motor 112 are therefore coordinated to maintain smooth movement.

Moreover, the reels 96, 98 and 100 are each of a different size corresponding to the size of the hose or cable supported thereon. Therefore, a different number of rotations are required by each of the reels 96, 98 and 100 to provide the same linear movement. The controller 110 utilizes data obtained by the sensor 116 to coordinate movement of all the reels 96, 98, 100 during insertion and removal of the PFM device 16 and the MFM device 78.

Referring to FIG. 1, in operation, preparation and measurement of a lateral sewer pipe proceeds with an initial inspection and clean out performed by the PFM device 16 followed by measurement performed by the MFM device 78.

The disclosed method of preparing a sewer pipe begins by inserting the PFM device 16 into a main sewer pipe 10 that connects to several lateral sewer pipes 14. The insertion step is performed by positioning the support vehicle 26 near a manhole 12 or other access passage. The PFM 16 is provided with two cameras 22, 42 and two clean out tools 20, 40. One of the cameras 22, 42 is provided as a spare such that preparation operations can continue without removal of the PFM device 16 should a problem with one of the cameras 22, 42 occur. The clean out tools 20, 40 are selected to provide cleanout options depending on what is found within each of the laterals. In this example, one of the clean out tools 20, 40 includes high pressure water cutting jets, and another of the tools includes a water powered abrading head that physically impacts debris or interior portions of the lateral 14.

Lowering of the PFM device 16 is conducted utilizing an insertion device 116 that guides the PFM device 16 from the support vehicle 26 into the main 10. The configuration of the insertion device 116 can vary to adapt to the specific conditions.

Insertion of the PFM device 16 not only requires the physical movement of the PFM device 16, but also a coordinated movement and feeding of the hydraulic hoses, water hoses, and communication cables. This coordinated movement is controlled at the control suit 104 by the controller 110. The controller 110 coordinates actuation of each of the reels 96, 98 and 100 to provide a common forward linear movement. As appreciated, each of the reels 96, 98 and 100 may rotate at different speeds to provide a common linear speed of the different hoses and cables. The controller 110 adjusts the reel speed in view of the sensed linear speed and displacement communicated from the sensors 106.

During the insertion process, the controller 110 operates in a first mode where all hoses and cables are moved forward at a common speed and displacement. This mode continues until the PFM device 16 is within the main 10. Once the PFM device 16 is within the main 10, it is attached to a machine 25 for moving the PFM device 16 within the main 10. The example PFM device 16 is not self moving and therefore the tow machine 25 is utilized to tow the PFM device 16 through the main 10. The tow machine 25 also includes the camera 27 for viewing and aligning the PFM device 16 with a lateral 14.

Once attached to the tow machine 25, the PFM device 16 is moved to the first lateral 14. Movement of the PFM device 16 is a coordinated movement between the tow machine 25 and the controller 110 operating in the first mode to feed out the hoses and cables at a common speed and displacement. This process is continued until the snout 30 of the PFM device 16 is aligned with a desired one of the laterals 14.

Once the snout 30 is positioned at the lateral 14, the collar 32 is rotated to align the opening of the snout 30 with the opening to the lateral 14. Rotation of the snout 30 is provided by actuation of the motor 34 at the control suite 104. Rotation of the collar 32 and thereby the snout 30 is performed utilizing the manual controls 114.

Once the snout 30 is aligned with the opening to the lateral 14, one of the cameras 22, 42 are driven through the snout 30 and into the lateral 14. The camera 22 transmits images of the internal condition of the lateral for display at the control suite 104. These images provided by the camera 22 are displayed on the display 108 and can also be recorded if desired.

Movement of the camera 22 out through the snout 30 and into the lateral 14 is accomplished by coordinated movement of the drive motor 48 within a drive module 28 of the PFM device 16 and the reel motor 112 driving the corresponding cable reel 98. The coordinated movement is accomplished utilizing a force sensor that detects a load on the reel. The drive motor 48 pulls on the corresponding cable to push the camera 22 into the lateral 22. The load produced by the drive motor 48 on the reel by pulling on the cable is detected by the force sensor. The load information is processed by the controller 110 and accounted for to synchronize operation of the drive motor 48 and the reel motor 112. In this example, the magnitude of load on the reel motor 112 is maintained such that the drive motor 48 is always exerting a pulling force on the reel motor 112. This pulling force exerted by the drive motor 48 maintains the cable in tension between the reel and the drive motor 48 to prevent tangling, kinking or other misalignment that could result from excessive slack. The amount of load is determined according to application specific parameters, such as the size of the cable, the length that the cable is extended and the distance between the PFM device 16 and the support vehicle 26.

With the camera 22 within the lateral, an operator stationed within the support vehicle can view the interior of the lateral 14 and determine if any remedial cleaning or preparation is required. In many instances, the lateral 14 may be in good condition for lining and not require any additional preparation actions. However, in many instances, debris and other accumulation may be required to ready the lateral 14 for liner installation.

When cleaning or other reconditioning is required, the operator will select which of the tools water powered tools 20, 40 to utilize. Once selected, that tool is separately driven into the lateral by actuating the corresponding one of the drive motors 48. The drive motor 48 for the selected water powered tool drives that tool through the snout 30 and into the lateral. Movement of the drive motor 48 to advance the water hose is synchronized with the reel motor 112 to balance movement of the hose into the lateral 14. Because the camera is already within the lateral 14, it is utilized to observe and position the water tool within the lateral. Moreover, the camera can be utilized to observe the cleaning operation.

The example PFM device 16 provides for separate and independent control of each of several tools that are extended into the lateral 14 at the same time. Therefore, the water powered clean out tool can be inserted past the camera to that part of the lateral requiring cleaning. The camera can be moved back away from the water powered tool to prevent damage to the camera. The water powered tool can then be activated, and the progress of the cleaning and reconditioning easily observed by moving the camera as needed.

Further, more than one of the water powered tools can be used without removing and reinserting the PFM device 16 into the main. Once the first water powered tool is utilized, further cleaning and preparation of the lateral can be accomplished by driving the second tool into the lateral 14. In this example, the first water powered tool 20 includes a water jet cutting head that cuts and flushes debris such as roots out of the lateral. Once this is complete further portions of the lateral may require a grinding operation to remove sharp edges. The second water powered tool 40 can then be advanced to the desired location, guided by the camera to grind away the undesired edges. This process can be repeated within the same lateral 14 without removing the PFM device 16, by merely advancing and retracting the tools as desired.

In the event that the first camera 22 is damaged or ceases to provide images as desired, the second camera 42 can be advanced into the lateral 14 so that preparation operations can continue without removing the PFM device 16. Once inspection and preparation of the lateral is complete, each of the tools 18 can be retracted into the PFM device 16. Retraction of the tools 18 is provided by actuation of the drive motor 48. Retraction of the hose or cable is also synchronized with the reel motor 112 such that a tension is maintained on each hose and cable to prevent kinking a tangling. In this example, the reel motor 112 will exert a load against the drive motor 48 to maintain a desired tension on each cable and hose. The desired tension is tailored to the specific hose or cable. For example, a control cable including fiber optic strands, coaxial cable, and control wires, may be pulled at a lesser tension to avoid damage, where the more durable water hoses are pulled with a greater force.

Once all of the tools 18 are retracted back into the PFM device 16, the PFM device 16 can be moved by the tow machine 25 to another lateral 14 for further inspection and preparation. The PFM device 16 can be moved to each lateral 14 within the main 10 and the process of preparation repeated without removing the PFM device 16 from the sewer. Once each of the lateral 14 in a section of main 10 have been inspected and prepared, the PFM device 16 can be removed.

Once each of the laterals 14 have been inspected and prepared measurements are required to facilitate preparation of the liner. Measurements that are desired included inner diameter of the lateral and length. Further, measurements to bends along the lateral may also be obtained. The MFM device 78 is installed into the main 10 in a similar manner to how the PFM device 16 is installed. The MFM device 78 is lowered through the manhole 12 to the main 10. The tow machine 25 is attached and the MFM device 78 is towed into place.

As should be appreciated, a measurement tool 80 can also be utilized with the PFM device 16 such that the MFM device 78 need not be utilized. Accordingly, the measurement tool 80 can be stored within the PFM device 16 and extended into the lateral or other pipe once the initial cleaning and inspection are completed. Storing, extending and controlling the measurement tool 80 from within the PFM device 16 reduces time by requiring only one insertion into any sewer pipe prior to lining. Moreover, using the measurement tool 80 with the PFM device 16 reduces the amount of hardware required to completed the desired tasks. However, in some instances, measurement may be all that is required, and therefore only the MFM device 78 described below need be utilized.

With the MFM device 78 is in place relative to a lateral 14, the snout 30 is rotated to align openings. The drive motor 48 is then activated and the measurement tool 80 advanced into the lateral 14. In this example method, location of the measurement tool 80 is recorded at the controller 110. The location of the measurement tool 80 is determined by the length of cable advanced from the reel. Accordingly, in this example, the measurement tool 80 is advanced to just within the opening of the lateral 14. That location is recorded at the controller 110. This location can be set as an initial position of the measurement tool 80 as it enters the lateral 14. Further movement into the lateral 14 is measured from this initial set point.

In this example method, the measurement tool 80 is advanced into the lateral 14 until a desired termination point is reached. In this example the termination point is that point where it is desired for the liner to extend. Once the termination point is reached, a distance from the initial set point is determined and corresponds with the required length of the liner. The initial set point and termination point are determined from data provided by the sensor 106 mounted to each of the reels. Moreover, because a sensor is disposed on each reel 116, a redundant measurement is provided to provide a check as to the accuracy of the distance measurement.

Once the measurement tool 80 has reached the termination point, diameter measurements are obtained. In this example the measurement tool 80 includes a measurement head 90 with radially extending fingers 86. The fingers 86 contact the inner surface of the lateral 14 and provide a measurement indicative of the inner diameter of the lateral. The measurement tool 80 is then retracted through the lateral to provide diameter measurements at different locations along the lateral. The diameter measurements can be taken either as the measurement tool 80 is being retracted, or can be taken at discrete locations by stopping the measurement tool 80 at different points along the lateral 14.

The resulting data obtained from the measurement tool 80 provides a map of the diameters of the lateral with respect to a position relative to the initial set point. This mapping of the lateral can be displayed by the display 100 and recorded for future use. Moreover, graphical representation can be generated for each lateral 14 to facilitate fabrication of specific liner for each lateral.

The process for measuring each of the inspected and prepared laterals 14 is repeated until all of the laterals in one main line section is measured and documented. Each of the laterals 14 are marked with an identifier such as street address or location within the main. The gathered measurement data is correlated to these identifiers for use in preparing liners for each specific lateral 14.

The disclosed example method provides for inspection, preparation and measurement of a lateral sewer from the main utilizing a PFM device 16 and MFM device 78. Moreover, the disclosed example method includes the method steps of inserting and operating separately controllable tools from a single preparation device that provides access to the lateral without a cleanout or other alternate access passage.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A method of inspecting and preparing a sewer comprising:
    inserting a preparation device within a pipe, the preparation device including a plurality of independently controllable tools attached to a corresponding plurality of conduits, wherein the preparation device comprises drive modules linked together and a launch head coupled to the drive modules, wherein each of the drive modules is controllable to move a corresponding one of the plurality of independently controllable tools out from the launch head;
    aligning an opening of the launch head with an opening within the pipe;
    extending from the preparation device at least one of the plurality of tools into the pipe by synchronizing operation of a drive motor within a corresponding one of the drive modules with a reel motor mounted outside of the pipe to move the corresponding conduit, wherein synchronizing operation of the drive motor with the reel motor includes detecting a load on the reel motor from a pull of a conduit corresponding to the extended tool exerted by the drive motor and maintaining a desired tension on the conduit between the drive motor and the reel motor by controlling a speed of the reel motor;
    wherein each of the drive modules controls a corresponding one of the plurality of preparation tools and the method further comprises extending a first one of the plurality of preparation tools from the launch head, extending a second one of the plurality of preparation tools from the launch head and independently controlling a position within the pipe of each of the first one of the plurality of preparation tools and second one of the plurality of preparation tools; and
    retracting one of the first and second preparation tools and extending a third preparation tool from the launch head and controlling the third preparation tool independent of any of the other preparation tools.

2. The method as recited in claim 1, including the step of moving the preparation device into a desired position within the pipe by synchronizing operation of one of the drive motors with a corresponding one of the reel motors.

3. The method as recited in claim 2, including the step of moving the preparation device forward by moving each of the reel motors at a separate speed for driving each of the plurality of conduits forward within the pipe at a common speed.

4. The method as recited in claim 1, including measuring internal dimensions of the sewer using a measurement head advanced into the sewer from the launch head.

5. The method as recited in claim 4, including communicating information obtained from the measurement head to a controller and storing the measurement information for each measured sewer section.

6. The method as recited in claim 1, including the step of extending the preparation tools into a lateral sewer pipe from the preparation device disposed within a main sewer pipe.

7. The method as recited in claim 6, including concurrently controlling at least two separately controllable tools within the lateral from the preparation device.

8. The method as recited in claim 1, wherein the launch head includes a snout defining the opening of the launch head and the method comprises rotating the snout relative to the launch head into alignment with the opening within the pipe.

9. The method as recited in claim 1, wherein the plurality tools are disposed within the launch head and the method comprise extending at least one of the plurality of tools from within the launch head onto the opening.

10. The method as recited in claim 1, wherein the first one of the plurality of tools comprises a cleaning tool and the second one of the plurality of tools comprises a camera, wherein the method further includes the step of removing debris from within the sewer with the cleaning tool and viewing the inside of the pipe with the camera with both concurrently disposed within the pipe.

* * * * *